US011919333B2

(12) United States Patent
Oka

(10) Patent No.: US 11,919,333 B2
(45) Date of Patent: Mar. 5, 2024

(54) HUB FOR HUMAN-POWERED VEHICLE

(71) Applicant: Shimano Inc., Osaka (JP)

(72) Inventor: Tomonari Oka, Osaka (JP)

(*) Notice: Subject to any disclaimer, the term of this patent is extended or adjusted under 35 U.S.C. 154(b) by 276 days.

(21) Appl. No.: 17/188,442

(22) Filed: Mar. 1, 2021

(65) Prior Publication Data
US 2022/0274440 A1  Sep. 1, 2022

(51) Int. Cl.
B60B 27/02 (2006.01)
B60B 1/04 (2006.01)
B60B 27/00 (2006.01)

(52) U.S. Cl.
CPC ............ B60B 27/023 (2013.01); B60B 1/041 (2013.01); B60B 1/042 (2013.01); B60B 27/0005 (2013.01); B60B 27/0031 (2013.01)

(58) Field of Classification Search
CPC .............. B60B 27/023; B60B 27/0031; B60B 27/0005; B60B 27/0078; B60B 27/047; B60B 27/0021; B60B 1/041; B60B 1/042
See application file for complete search history.

(56) References Cited

U.S. PATENT DOCUMENTS

| 5,909,931 | A | 6/1999 | Tabe |
| 6,202,813 | B1 | 3/2001 | Yahata et al. |
| 6,557,684 | B1 * | 5/2003 | Jager ................... B60B 27/047 192/64 |
| 7,059,686 | B2 | 6/2006 | Kanehisa |
| 7,413,350 | B2 | 8/2008 | Kanehisa et al. |
| 7,938,242 | B2 | 5/2011 | Chen |
| 9,085,197 | B2 | 7/2015 | Fujita |
| 9,132,883 | B2 | 9/2015 | Bettin |
| 9,199,509 | B2 | 12/2015 | Koshiyama |
| 9,669,656 | B2 | 6/2017 | Lim et al. |
| 9,707,801 | B2 | 7/2017 | Fujita et al. |

(Continued)

FOREIGN PATENT DOCUMENTS

DE    10 2010 033 268 A1    2/2012
DE    102019103016 A1 *    8/2020    ........... B60B 27/023
(Continued)

OTHER PUBLICATIONS

Machine Translation of FR 2926247 A1, 5 pages (Year: 2009).*
Machine Translation of FR 3039458 A1, 9 pages (Year: 2017).*
Machine Translation of DE 102019103016 A1, 6 pages (Year: 2020).*

Primary Examiner — S. Joseph Morano
Assistant Examiner — Emily G. Castonguay
(74) Attorney, Agent, or Firm — Global IP Counselors, LLP

(57) ABSTRACT

A hub is provided for a human-powered vehicle, and includes a hub axle, a rotating body, a bearing, an inner retainer and an outer retainer. The rotating body is rotatably mounted on the hub axle. The bearing rotatably coupling the rotating body to the hub axle. The bearing includes an inner race, an outer race and a plurality of roller elements. The inner race has an axially facing portion abutting an inner abutment of the hub axle. The outer race has an axially facing portion abutting an outer abutment of the rotating body. The roller elements are disposed between the inner race and the outer race. The inner retainer is coupled to the hub axle and abuts an axially facing portion of the inner race. The outer retainer is coupled to the rotating body and abuts an axially facing portion of the outer race.

15 Claims, 6 Drawing Sheets

(56) References Cited

U.S. PATENT DOCUMENTS

| | | | |
|---|---|---|---|
| 10,654,314 B2 | 5/2020 | Nakajima et al. | |
| 10,780,737 B2 | 9/2020 | Nakajima et al. | |
| 2016/0144661 A1* | 5/2016 | Walthert | B60B 27/026 301/124.1 |
| 2017/0015136 A1* | 1/2017 | Braedt | B60B 27/0015 |
| 2018/0334218 A1* | 11/2018 | Schlanger | B60B 35/004 |

FOREIGN PATENT DOCUMENTS

| | | | | |
|---|---|---|---|---|
| FR | 2926247 A1 * | 7/2009 | | B60B 27/0005 |
| FR | 3039458 A1 * | 2/2017 | | B60B 27/0005 |
| TW | M536165 U | 2/2017 | | |

\* cited by examiner

HUB FOR HUMAN-POWERED VEHICLE

BACKGROUND

Technical Field

This disclosure generally relates to a hub for a human-powered vehicle.

Background Information

Some wheels for human-powered vehicles (e.g., bicycle) have a hub, a plurality of spokes and an annular rim. The hub has a hub axle that is non-rotatably mounted to a frame of the human-powered vehicle. The hub has a hub shell that is coaxially coupled to the hub axle so that the hub shell is disposed radially outwardly with respect to the hub axle. The bearings are configured and arranged to support the hub shell so that the hub shell can freely rotate around the hub axle. In almost all types of bicycles except fixed gear and track racers, a wheel of the bicycle, typically the rear wheel, is provided with a bicycle freewheel that is arranged on a hub of the wheel. The bicycle freewheel usually has a one-way clutch function whereby it only transfers torque in one direction. Thus, freewheels are used so that the bicycle can advance freely without any rotation of the pedals (i.e., during coasting). During coasting, the bicycle freewheel is considered to be in a state of freewheeling in which the bicycle wheel can freely rotate while the sprockets remain stationary.

SUMMARY

Generally, the present disclosure is directed to various features of a hub for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a hub for a human-powered vehicle is provided that basically comprises a hub axle, a rotating body, a first bearing, an inner retainer and an outer retainer. The hub axle includes a first inner abutment. The hub axle defines a rotational axis. The rotating body is rotatably mounted on the hub axle to rotate around the rotational axis. The rotating body includes a first outer abutment. The first bearing is disposed between the hub axle and the rotating body in a radial direction with respect to the rotational axis to rotatably couple the rotating body to the hub axle. The first bearing includes a first inner race, a first outer race and a plurality of first roller elements. The first inner race has a first axially facing portion abutting the first inner abutment of the hub axle. The first outer race has a first axially facing portion abutting the first outer abutment of the rotating body. The first roller elements are disposed between the first inner race and the first outer race. The inner retainer is coupled to the hub axle and abuts a second axially facing portion of the first inner race of the first bearing. The outer retainer is coupled to the rotating body and abuts a second axially facing portion of the first outer race of the first bearing.

With the hub according to the first aspect, it is possible to set an axial position of the rotating body with respect to the hub axle without using spacers.

In accordance with a second aspect of the present disclosure, the hub according to the first aspect is configured so that the inner retainer is adjustably coupled to the hub axle in an axial direction with respect to the rotational axis.

With the hub according to the second aspect, it is possible to easily set an axial position of the first bearing with respect to the hub axle.

In accordance with a third aspect of the present disclosure, the hub according to the first or second aspect is configured so that the inner retainer has an internal thread that is threadedly engaged with an external thread of the hub axle.

With the hub according to the third aspect, it is possible to easily set an axial position of the first bearing with respect to the hub axle by simply screwing the inner retainer onto the hub axle.

In accordance with a fourth aspect of the present disclosure, the hub according to any one of the first to third aspects is configured so that the outer retainer is adjustably coupled to the rotating body in an axial direction with respect to the rotational axis.

With the hub according to the fourth aspect, it is possible to easily set an axial position of the first bearing with respect to the rotating body.

In accordance with a fifth aspect of the present disclosure, the hub according to any one of the first to fourth aspects is configured so that the outer retainer has an external thread that is threadedly engaged with an internal thread of the rotating body.

With the hub according to the fifth aspect, it is possible to set an axial position of the first bearing with respect to the rotating body by simply screwing the outer retainer into the rotating body.

In accordance with a sixth aspect of the present disclosure, the hub according to any one of the first to fifth aspects is configured so that the hub axle includes a hollow body.

With the hub according to the sixth aspect, the overall weight of the hub can be reduced and/or the hub axle can be configured to receive a frame securing device.

In accordance with a seventh aspect of the present disclosure, the hub according to any one of the first to sixth aspects is configured so that the first inner abutment is integrally formed on an outer surface of the hub axle as an integrated part of the hub axle.

With the hub according to the seventh aspect, it is possible to simplify the construction of the hub axle.

In accordance with an eighth aspect of the present disclosure, the hub according to any one of the first to seventh aspects is configured so that the first outer abutment is integrally formed on an inner surface of the rotating body as an integrated part of the rotating body.

With the hub according to the eighth aspect, it is possible to simplify the construction of the rotating body.

In accordance with a ninth aspect of the present disclosure, the hub according to any one of the first to eighth aspects further comprises a second bearing disposed between the hub axle and the rotating body in a radial direction with respect to the rotational axis to rotatably couple the rotating body to the hub axle. The second bearing includes a second inner race, a second outer race and a plurality of second rolling elements. The second inner race has a third axially facing portion facing a second inner abutment of the hub axle. The second outer race has a third axially facing portion facing a second outer abutment of the rotating body. The second rolling elements are disposed between the second inner race and the second outer race.

With the hub according to the ninth aspect, the rotating body is reliably supported on the hub axle to rotate with respect to the hub axle.

In accordance with a tenth aspect of the present disclosure, the hub according to the ninth aspect is configured so that at least one the second inner abutment of the hub axle and the second outer abutment of the rotating body is axially spaced from the second bearing.

With the hub according to the tenth aspect, the second bearing can be press-fitted onto one of the hub axle and the rotating body to axially position the second bearing. In addition, the second bearing is less susceptible to axial forces.

In accordance with an eleventh aspect of the present disclosure, the hub according to the ninth or tenth aspect is configured so that an outermost point of the first inner abutment of the hub axle is radially spaced from the rotational axis by a first radial distance, and an innermost point of the second inner abutment of the hub axle is radially spaced from the rotational axis by a second radial distance that is larger than the first radial distance.

With the hub according to the eleventh aspect, the second bearing can be sized such that the second bearing pass over the first inner abutment of the hub axle during assembly of the hub.

In accordance with a twelfth aspect of the present disclosure, the hub according to any one of the ninth to eleventh aspects is configured so that an innermost point of the first outer abutment of the rotating body is radially spaced from the rotational axis by a third radial distance, and an innermost point of the second outer abutment of the rotating body is radially spaced from the rotational axis by a fourth radial distance that is larger than the third radial distance.

With the hub according to the twelfth aspect, the first bearing can be smaller in a diameter than the second bearing. In addition, the second bearing can be easily attached to the hub axle.

In accordance with a thirteenth aspect of the present disclosure, the hub according to the twelfth aspect is configured so that an outermost point of the first inner abutment of the hub axle is radially spaced from the rotational axis by a first radial distance, and the fourth radial distance is larger than the first radial distance.

With the hub according to the thirteenth aspect, the second outer abutment of the rotating body and the first inner abutment of the hub axle can pass by each other during assembly of the hub.

In accordance with a fourteenth aspect of the present disclosure, the hub according to any one of the ninth to thirteenth aspects is configured so that the second inner abutment is integrally formed on an outer surface of the hub axle as an integrated part of the hub axle.

With the hub according to the fourteenth aspect, it is possible to simplify the construction of the hub axle.

In accordance with a fifteenth aspect of the present disclosure, the hub according to any one of the ninth to fourteenth aspects is configured so that the second outer abutment is integrally formed on an inner surface of the rotating body as an integrated part of the rotating body.

With the hub according to the fifteenth aspect, it is possible to simplify the construction of the rotating body.

In accordance with a sixteenth aspect of the present disclosure, the hub according to any one of the first to fifteenth aspects is configured so that the rotating body includes a sprocket support.

With the hub according to the sixteenth aspect, it is possible to mount a sprocket to the hub for driving the hub.

In accordance with a seventeenth aspect of the present disclosure, the hub according to any one of the first to sixteenth aspects further comprises a hub shell rotatably mounted on the hub axle to rotate around the rotational axis. The rotating body is coupled to the hub shell to rotate together in a driving rotational direction around the rotational axis. The rotating body is configured to rotate relative to the hub shell in a non-driving rotational direction around the rotational axis.

With the hub according to the seventeenth aspect, the rotating body functions as freewheel with respect to the hub shell that is rotatably supported on the hub axle.

In accordance with an eighteenth aspect of the present disclosure, the hub according to any one of the first to fifteenth aspects is configured so that the rotating body includes a spoke attachment structure.

With the hub according to the eighteenth aspect, the rotating body functions as a hub shell that is rotatably supported on the hub axle.

Also, other objects, features, aspects and advantages of the disclosed hub will become apparent to those skilled in the art from the following detailed description, which, taken in conjunction with the annexed drawings, discloses preferred embodiments of the hub.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
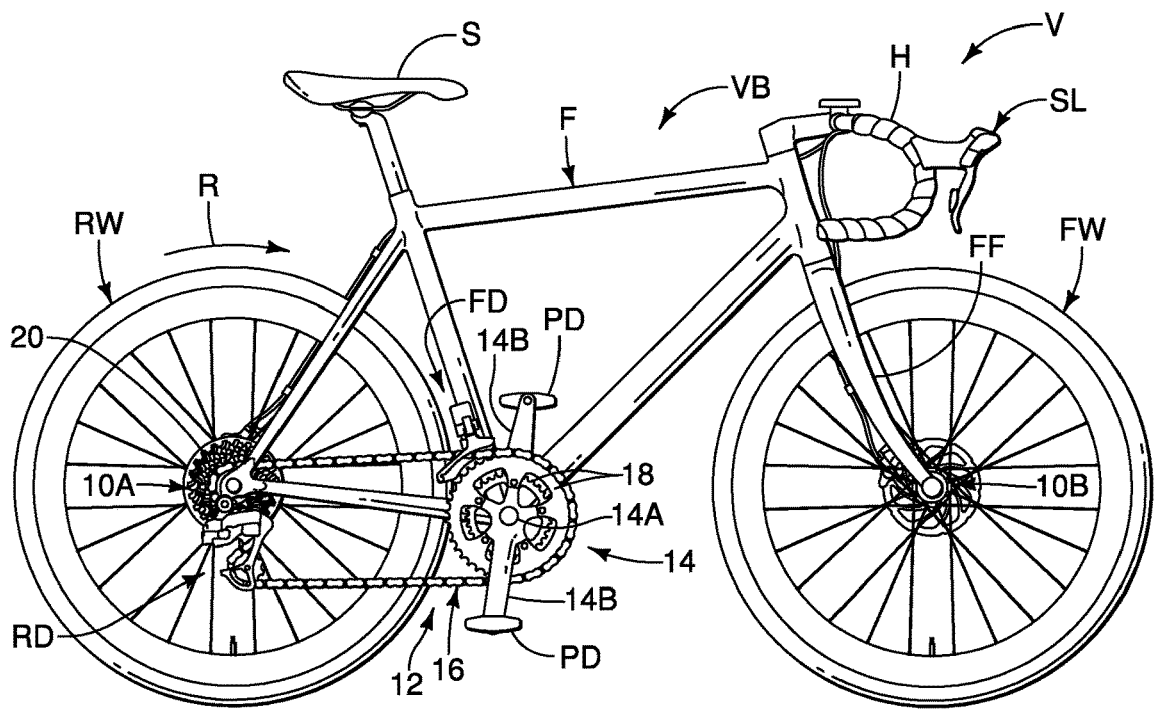
FIG. 1 is a side elevational view of a human-powered vehicle (e.g., a bicycle) equipped with a pair of hubs in accordance with one embodiment.

Referring initially to FIG. 1, a human-powered vehicle V is illustrated that is equipped with a pair of hubs 10A and 10B in accordance with one illustrated embodiment. In this embodiment, the human-powered vehicle V is a bicycle and the hubs 10A and 10B are bicycle hubs. The human-powered vehicle V includes a front wheel FW and a rear wheel RW rotatably attached to a vehicle body VB. Here, the hub 10A is provided to the rear wheel RW, and the hub 10B is provided to the front wheel FW. The vehicle body VB is also provided with a handlebar H and a front fork FF for steering the front wheel FW. The vehicle body VB is also provided with a saddle S for a rider to sit on while riding the human-powered vehicle V.

As seen in FIG. 1, the human-powered vehicle V further comprises a drive assembly 12. The drive assembly 12 comprises the hub 10A. Here, for example, the drive assembly 12 is a chain-drive type. The drive assembly 12 further comprises a crank 14, a chain 16 (i.e., a force transmission member), a plurality of front sprockets 18 (i.e., a front rotatable body) and a plurality of rear sprockets 20 (i.e., a rear rotatable body). The chain 16 provides mechanical communication between the crank 14 and the hub 10A. Thus, a rotational force caused by rotation of the crank 14 in a forward traveling direction R can be transmitted to the hub 10A via the chain 16. The crank 14 includes a crank axle 14A and a pair of crank arms 14B. A pedal PD is rotatably coupled to the distal end of each of the crank arms 14B. The crank arms 14B are provided on opposite ends of the crank axle 14A. The chain 16 can provide a mechanical connection between the front sprockets 18 and the rear sprockets 20 provided on the hub 10A.

Here, the human-powered vehicle V further includes a front derailleur FD that is attached to the vehicle body VB for shifting the chain 16 between the front sprockets 18 that are provided to the crank 14. Also, here, the human-powered vehicle V further includes a rear derailleur RD that is attached to the rear of the vehicle body VB for shifting the chain 16 between the rear sprockets 20 that are provided to the hub 10. The front derailleur FD and the rear derailleur RD are one type of gear changing device. Here, for example, the front derailleur FD and the rear derailleur RD are electric derailleurs (i.e., electric gear changing devices). The front derailleur FD and the rear derailleur RD are operated when a rider of the human-powered vehicle V manually operates a gear shift operating device or shifter SL. The front derailleur FD and the rear derailleur RD can also be automatically operated based on traveling conditions and/or operating conditions of the human-powered vehicle V.

The structure of the hub 10A will now be described with particular reference to FIGS. 2 and 3. The hub 10A basically comprises a hub axle 30, a hub shell 32 and a sprocket support 34. The hub shell 32 and the sprocket support 34 are each one example of a rotating body. In other words, the hub 10A comprises a hub axle (e.g., the hub axle 30) and a rotating body (e.g., the sprocket support 34). The hub axle 30 defines a rotational axis CA. The hub 10A further comprises a hub shell (e.g., the hub shell 32) rotatably mounted on the hub axle 30 to rotate around the rotational axis CA. The hub shell 32 and the sprocket support 34 are rotatably mounted on the hub axle 30 to rotate around the rotational axis CA. Thus, in the hub 10A, the rotating body includes the sprocket support 34. In other words, the rotating body (e.g., the sprocket support 34) is rotatably mounted on the hub axle 30 to rotate around the rotational axis CA.

The sprocket support 34 is rotatably coupled to the hub axle 30 to transmit a driving force from the sprocket support 34 to the hub shell 32 while the sprocket support 34 rotates in a driving direction D1 as explained later. Basically, the hub axle 30 is non-rotatably attached to the vehicle body VB, and the hub shell 32 is rotatably mounted around the hub axle 30. As indicated in FIG. 1, the hub shell 32 rotates relative to the hub axle 30 in a driving direction D1 which corresponds to a forward traveling direction R of the rear wheel RW. The sprocket support 34 is configured to support the rear sprockets 20.

The sprocket support 34 constitutes a driving member that has a tubular shape. The sprocket support 34 is rotatably mounted on the hub axle 30 to rotate around the rotational axis CA. The sprocket support 34 has an outer peripheral surface that is provided with a plurality of axially extending splines 35 (FIG. 2) for non-rotatably engaging the rear sprockets 20 (FIG. 1) in a conventional manner. The splines 35 are parallel to each other, and extend parallel to the rotational axis CA. The rear sprockets 20 (FIG. 1) are held on the sprocket support 34 in a conventional manner such as a conventional nut that screws into the sprocket support 34.

Figure 2:
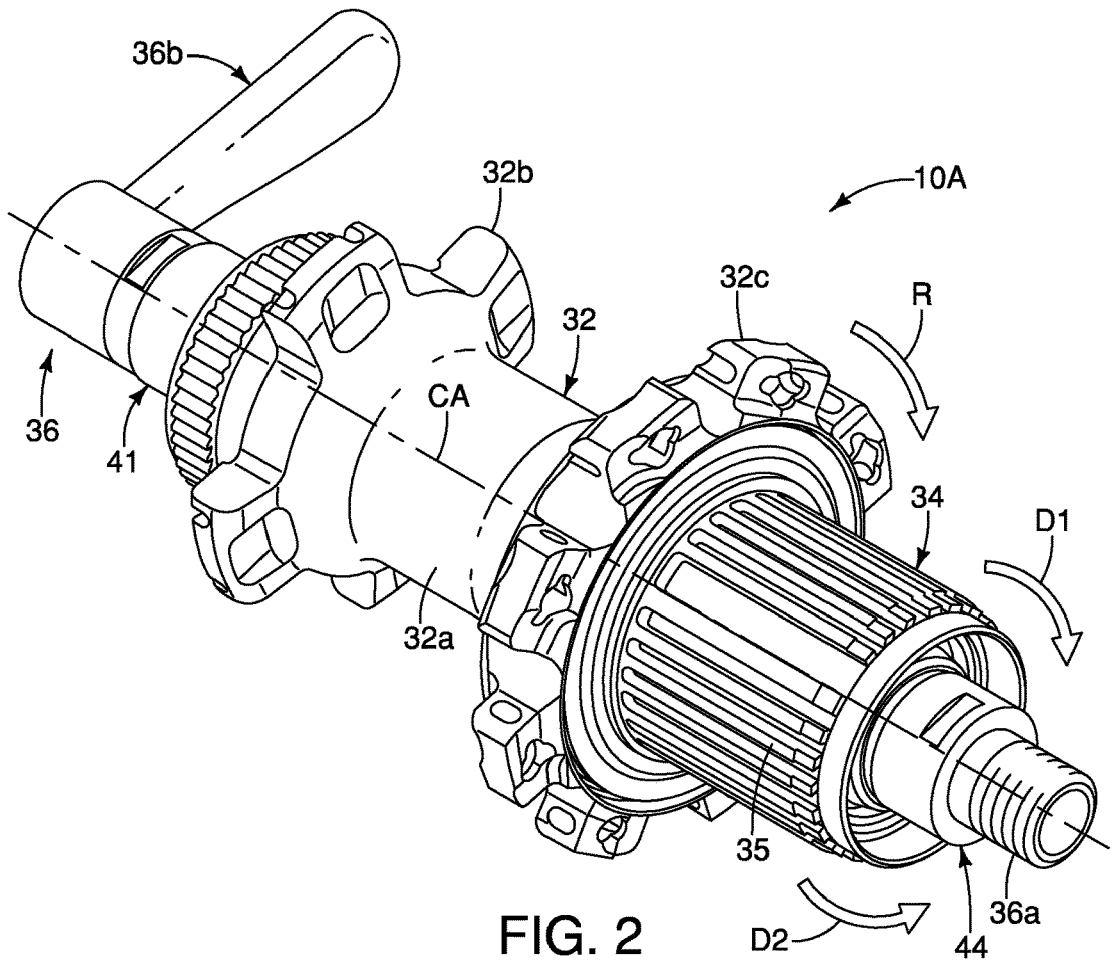
FIG. 2 is a perspective view of the hub of a rear wheel of the human-powered vehicle illustrated in FIG. 1.

As shown in FIG. 2, a frame securing device 36 is provided for attaching the hub 10A to a bicycle frame F (See FIG. 1) in a conventional manner. In the first illustrated embodiment, the frame securing device 36 includes a skewer or spindle 36a that has a cam lever mechanism 36b mounted at one end of the spindle 36a. Thus, the hub 10 can be mounted onto a rear section of the vehicle body VB of the human-powered vehicle V as seen in FIG. 1.

Figure 3:
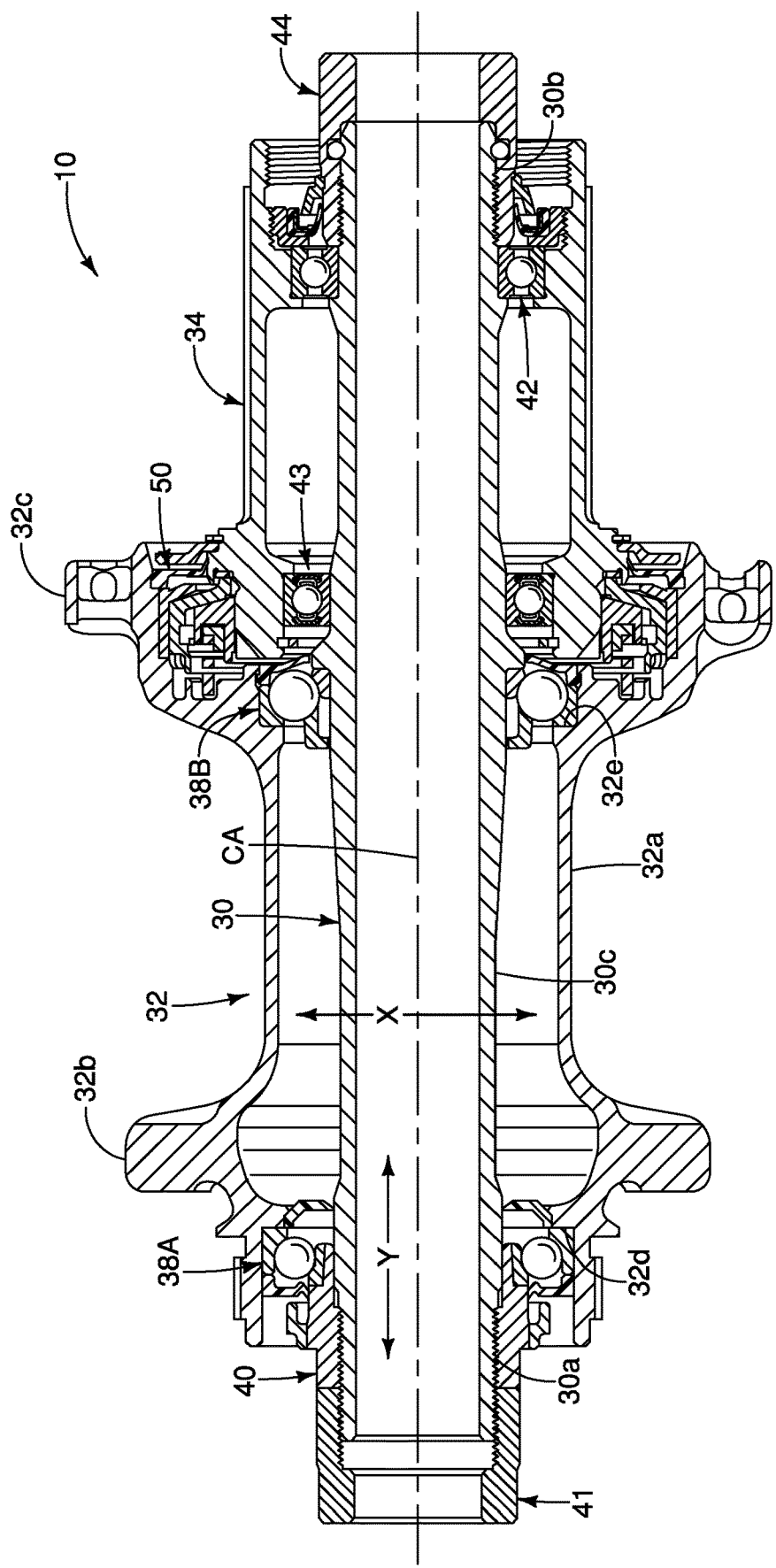
FIG. 3 is a longitudinal cross sectional view of the hub illustrated in FIG. 2 with the frame securing device omitted.

As shown in FIG. 3, the hub shell 32 is rotatably mounted on the hub axle 30 to rotate around the rotational axis CA. The hub shell 32 is a rigid member that is made of a suitable material such as a metal material or a reinforced plastic material. The hub shell 32 has a center tubular body 32a and a pair of spoke attachment flanges 32b and 32c extending radially outward from the center tubular body 32a. The spoke attachment flanges 32b and 32c are configured to receive the inner ends of the spokes of the rear wheel in a conventional manner.

As shown in FIG. 3, the hub axle 30 is a rigid member having a first end portion 30a and a second end portion 30b. Here, the hub axle 30 includes a hollow body 30c. The hollow body 30c is configured for receiving the spindle 36a therethrough. The hub 10A further comprises at least one bearing assembly for rotatably supporting the hub shell 32 on the hub axle 30. In the illustrated embodiment, the hub shell 32 is rotatably mounted on the hub axle 30 by a first bearing 38A and a second bearing 38B. The first bearing 38A is disposed at the first end portion 30a of the hub axle 30, while the second bearing 38B is adjacent to the second end portion 30b of the hub axle 30. The first bearing 38A is axially spaced from the second bearing 38B with respect to an axial direction Y that is parallel to the rotational axis CA. The first bearing 38A is closer to the first end portion 30a than the second bearing 38B. The second bearing 38B is closer to the second end portion 30b than the first bearing 38A. The second bearing 38B is closer to the sprocket support 34 than the first bearing 38A. Here, the first bearing 38A and the second bearing 38B are angular contact ball bearings. The first bearing 38A and the second bearing 38B are conventional bearings that are well known in the bicycle field, and thus, the first bearing 38A and the second bearing 38B will not be discussed any or illustrated in detail herein. Also, other bearing arrangements can be used to rotatably support the hub shell 32 on the hub axle 30 as needed and/or desired. The first bearing 38A and the second bearing 38B are angular contact ball bearings. Angular contact ball bearings are generally more resistant to axial forces than radial ball bearings. In this specification, the radial ball bearings are deep groove radial ball bearings.

The hub 10A further comprises a retainer 40 that is screwed onto the first end portion 30a of the hub axle 30. When the retainer 40 is screwed onto the first end portion 30a of the hub axle 30, an axial force is applied to the first bearing 38A to push the first bearing 38A against a first internal abutment 32d of the hub shell 32. Thus, the axial position of the first bearing 38A is set by the retainer 40. Also, when the retainer 40 is screwed onto the first end portion 30a of the hub axle 30, the hub axle 30 applies an axial force to the second bearing 38B to push the second bearing 38B against a second internal abutment 32e of the hub shell 32. The first internal abutment 32d faces in an opposite axial direction from the second internal abutment 32e. In this way, axial movement of the hub shell 32 with respect to the hub axle 30 is limited. An end cap 41 is also screwed onto the first end portion 30a of the hub axle 30 to such that the retainer 40 and the end cap 41 can be tightened together to lock the retainer 40 in place on the hub axle 30. Here, as seen in FIG. 3, the first internal abutment 32d is axially spaced from the second internal abutment 32e with respect to an axial direction Y that is parallel to the rotational axis CA. The first internal abutment 32d is disposed near the spoke attachment flange 32b, while the second internal abutment 32e is disposed near the spoke attachment flange 32c. Thus, the first internal abutment 32d is closer to the first end portion 30a of the hub axle 30 than the second internal abutment 32e with respect to an axial direction Y that is parallel to the rotational axis CA. Also, here, the first internal abutment 32d and the second internal abutment 32e are disposed substantially the same distance from the rotational axis CA of the hub axle 30 with respect to a radial direction X that is perpendicular to the rotational axis CA. The first internal abutment 32d faces in the opposite direction from the second internal abutment 32e with respect to the axial direction Y. The first internal abutment 32d faces towards the first end portion 30a of the hub axle 30. The second internal abutment 32e faces towards the second end portion 30b of the hub axle 30.

Also, as shown in FIG. 3, the hub 10A further comprises at least one bearing for rotatably supporting the sprocket support 34 on the hub axle 30. The hub 10A further comprises a first bearing 42. Depending on the configurations of the sprocket support 34 and the first bearing 42, the hub 10A can have only the first bearing 42 rotatably supporting the sprocket support 34 on the hub axle 30. In any case, the first bearing 42 is disposed between the hub axle 30 and the sprocket support 34 (i.e., the rotating body) in the radial direction X with respect to the rotational axis CA to rotatably couple the rotating body to the hub axle 30. The first bearing 42 includes a first inner race 42a, a first outer race 42b and a plurality of first roller elements 42c. The first roller elements 42c are disposed between the first inner race 42a and the first outer race 42b.

In the illustrated embodiment, the hub 10A further comprises a second bearing 43. In this case, the second bearing 43 is disposed between the hub axle 30 and the sprocket support 34 (i.e., the rotating body) to rotatably couple the rotating body in the radial direction X with respect to the rotational axis CA to the hub axle 30. The second bearing 43 includes a second inner race 43a, a second outer race 43b and a plurality of second rolling elements 43c. The second rolling elements 43c are disposed between the second inner race 43a and the second outer race 43b. The first bearing 42 and the second bearing 43 are radial ball bearings. The first bearing 42 is axially spaced from the second bearing 43 with respect to an axial direction Y that is parallel to the rotational axis CA. The first bearing 42 is closer to the second end portion 30b than the second bearing 43. The second bearing 43 is closer to the first end portion 30a than the first bearing 42. The second bearing 43 is closer to the hub shell 32 than the first bearing 42.

As shown in FIG. 3, the hub 10A comprises an inner retainer 44 and an outer retainer 46. The inner retainer 44 and the outer retainer 46 are configured to retain the sprocket support 34 on the hub axle 30 and axially position the first bearing 42 and the sprocket support 34 with respect to the hub axle 30. The sprocket support 34 (i.e., the rotating body) transmits rotation to the hub shell 32 so that the sprocket support 34 rotates with the hub shell 32 where the sprocket support 34 is rotated in the driving direction D1 (see FIG. 2). In other words, the sprocket support 34 (i.e., the rotating body) is coupled to the hub shell 32 to rotate together in the driving rotational direction D1 around the rotational axis CA. However, rotation of the sprocket support 34 (i.e., the rotating body) is not transmitted to the hub shell 32 where the sprocket support 34 is rotated in a non-driving direction D2 (see FIG. 2). Thus, the sprocket support 34 (i.e., the rotating body) is configured to rotate relative to the hub shell 32 in the non-driving rotational direction D2 around the rotational axis CA. In particular, the hub 10A further comprises a planar ratchet assembly 50 to transmit rotation from the sprocket support 34 to the hub shell 32 where the sprocket support 34 is rotated in the driving direction D1 but not to transmit rotation from the sprocket support 34 to the hub shell 32 where the sprocket support 34 is rotated in the non-driving direction D2. The planar ratchet assembly 50 is disposed radially outwardly of the second bearing 43. The planar ratchet assembly 50 can be disposed radially outwardly of the second bearing 38B. Therefore, the second bearing 43 can be disposed near the second bearing 38B with respect to an axial direction Y that is parallel to the rotational axis CA. Thus, an axial length of the hub 10A can be reduced. A distance between the first bearing 42 and the second bearing 43 can be increased. Thus, the sprocket support 34 is stably held by the first bearing 43 and the second bearing 43. A distance between the first bearing 38A and the second bearing 38B can be increased. Thus, the hub shell 32 is stably held by the first bearing 38A and the second bearing 38B.

The planar ratchet assembly 50 functions as a one-way clutch between the hub shell 32 and the sprocket support 34 to permit coasting or freewheeling of the sprocket support 34 with respect to the hub shell 32. In particular, coasting or freewheeling occurs when the sprocket support 34 is stopped from rotating in the driving direction D1 (i.e., clockwise about the rotational axis CA as viewed from the freewheel side of the hub 10A) by a chain 16, while the hub shell 32 rotates in the forward traveling direction R. Additionally, coasting or freewheeling occurs when the hub shell 32 rotates faster in the forward traveling direction R than the sprocket support 34 rotates in the driving direction D1 by the chain 16. Also, coasting or freewheeling occurs when the sprocket support 34 rotates in the non-driving direction D2 by the chain 16 due to the rider pedaling backwards. While a planar ratchet assembly 50 is illustrated for transmitting rotation from the sprocket support 34 to the hub shell 32 in the driving direction D1 but not in the non-driving direction D2, it will be apparent from this disclosure that other types of structures can be used instead of the planar ratchet assembly 50. For example, a pawl-type, one-way clutch can be used such as the one disclosed in U.S. Pat. No. 6,202,813 (assigned to Shimano Inc.).

Figure 4:
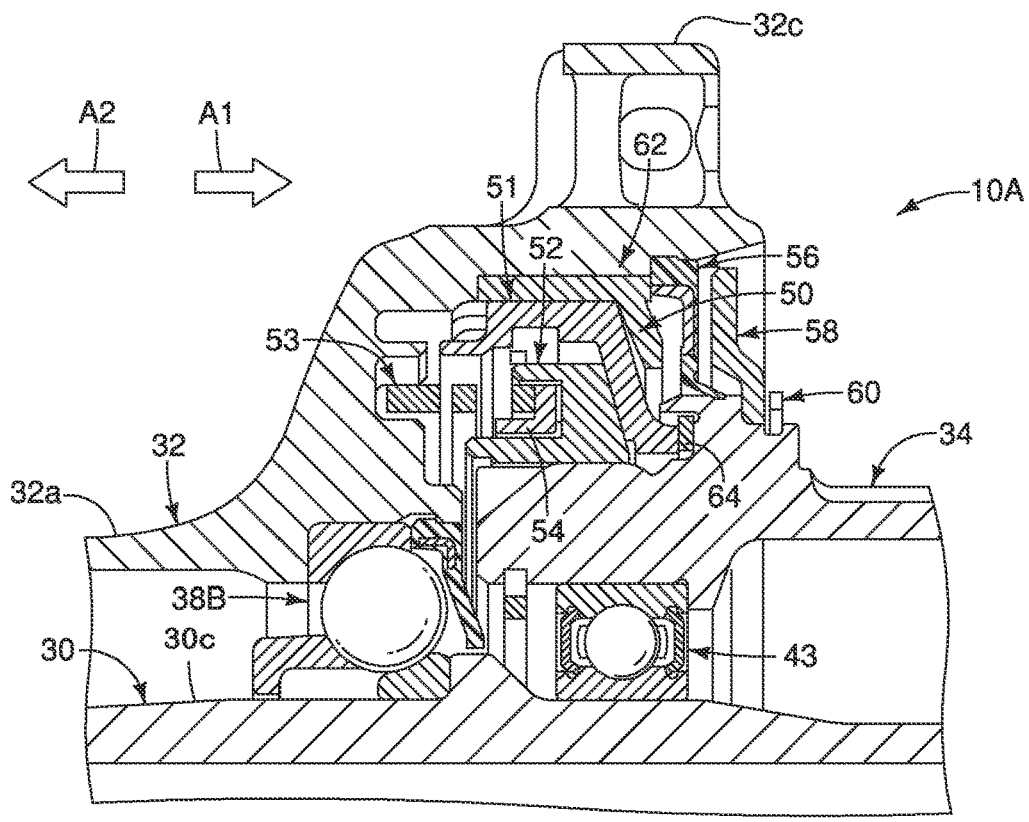
FIG. 4 is an enlarged cross sectional view of a portion of the hub illustrated in FIG. 3 showing the first ratchet member and the second ratchet member of the planar ratchet assembly in an engaged position for driving a hub body of the hub.
Figure 5:
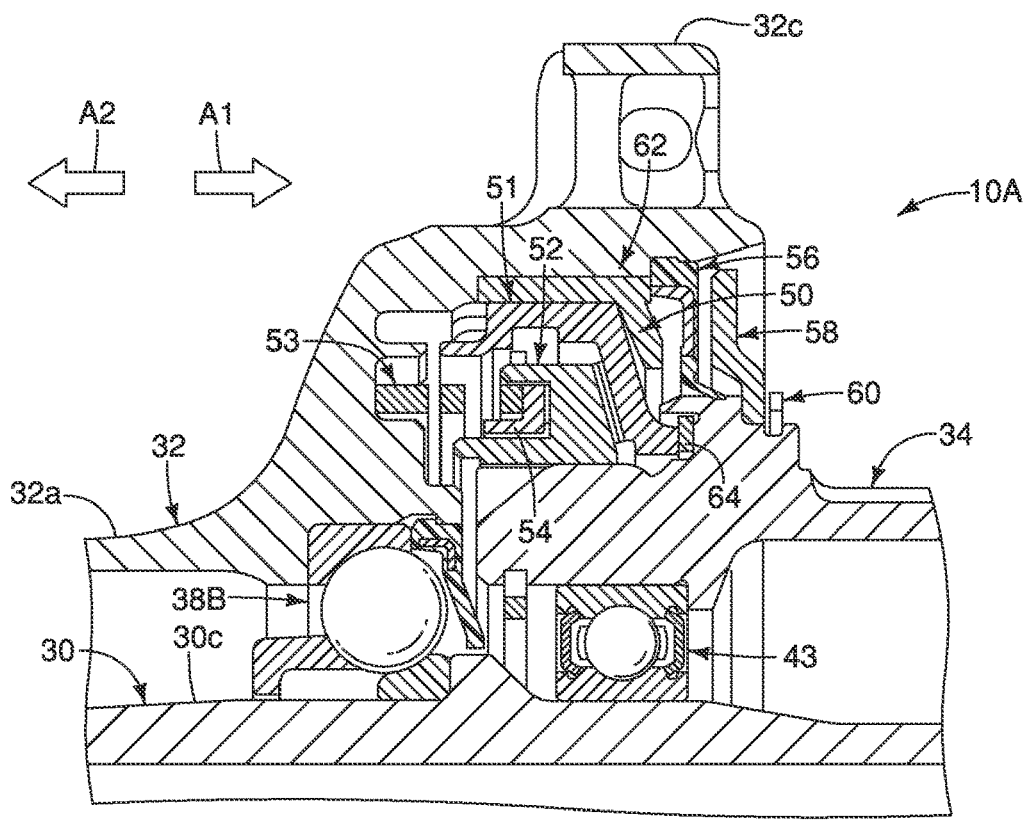
FIG. 5 is an enlarged cross sectional view of the portion of the hub illustrated in FIG. 4 showing the first ratchet member and the second ratchet member in a disengaged position for coasting.

Referring to FIGS. 4 and 5, the planar ratchet assembly 50 basically comprises a first ratchet member 51 and a second ratchet member 52. The planar ratchet assembly 50 further comprises a biasing element 53. As shown in FIGS. 4 and 5, the biasing element 53 is disposed between the hub shell 32 and the second ratchet member 52. The biasing element 53 biases the second ratchet member 52 in a first axial direction A1 toward the first ratchet member 51 into the engagement position. Here, the first axial direction A1 refers to a direction that is parallel to the rotational axis CA to the hub axle 30 and that points in a direction towards the second end portion 30*b* of the hub axle 30 having the sprocket support 34. Preferably, the biasing element 53 is configured to rotate with the hub shell 32. In the illustrated embodiment, the biasing element 53 has a protrusion that is disposed in a recess of the hub shell 32 so that the biasing element 53 rotates together with the hub shell 32. With the sprocket support 34 in a rest position (i.e., no torque being applied thereto), the biasing element 53 maintains the second ratchet member 52 in driving engagement with the first ratchet member 51. The biasing element 53 includes, for example, a compression spring in the illustrated embodiment and the friction member 54. In other words, in the illustrated embodiment, the friction member 54 is provided as a separate piece that is fixed on the end of the compression spring of the biasing element 53 that faces the second ratchet member 52. Alternatively, the friction member 54 can be omitted such that an end coil of the biasing element 53 forms a friction member.

The first ratchet member 51 and the second ratchet member 52 move relative to each other in the axial direction as shown in FIG. 5. In particular, the second ratchet member 52 is biased in the first axial direction A1 towards the first ratchet member 51 into an engaged position by the biasing element 53 as seen in FIG. 4. During coasting, the sprocket support 34 stops rotating in the driving direction D1 and the hub shell 32 continues to rotate in the forward traveling direction R. As a result of the sprocket support 34 stop rotating in the driving direction D1, the second ratchet member 52 is moved in the second axial direction A2 away from the first ratchet member 51 against the force of the biasing element 53. Here, the second axial direction A2 refers to a direction that is parallel to the rotational axis CA to the hub axle 30 and that points in a direction away from the second end portion 30*b* of the hub axle 30 having the sprocket support 34. In this way, the first ratchet member 51 and the second ratchet member 52 can slide relative to each other in an axial direction with respect to the rotational axis CA as seen in FIG. 5.

As seen in FIGS. 4 and 5, a dust shield 56 is provided for covering annular gap between the sprocket support 34 and the hub shell 32. A support retaining assembly retains the dust shield 56 to the hub shell 32. The support retaining assembly includes an outer cap 58 and a retaining ring or clip 60. The outer cap 58 is disposed between the sprocket support 34 and the hub shell 32. The retaining ring or clip 60 disposed in a recess in the sprocket support 34 to retain on the retaining ring 60 on the sprocket support 34 and to limit outward axial movement of the outer cap 58. The hub 10A further includes a circumferential spacer 62 and an axial spacer 64. The circumferential spacer 62 is disposed between the hub shell 32 and the first ratchet member 51 to take up the circumferential space between the first ratchet member 51 and the hub shell 32. The axial spacer 64 is disposed between the sprocket support 34 and the first ratchet member 51 to take up the axial space between the sprocket support 34 and the first ratchet member 51.

Figure 6:
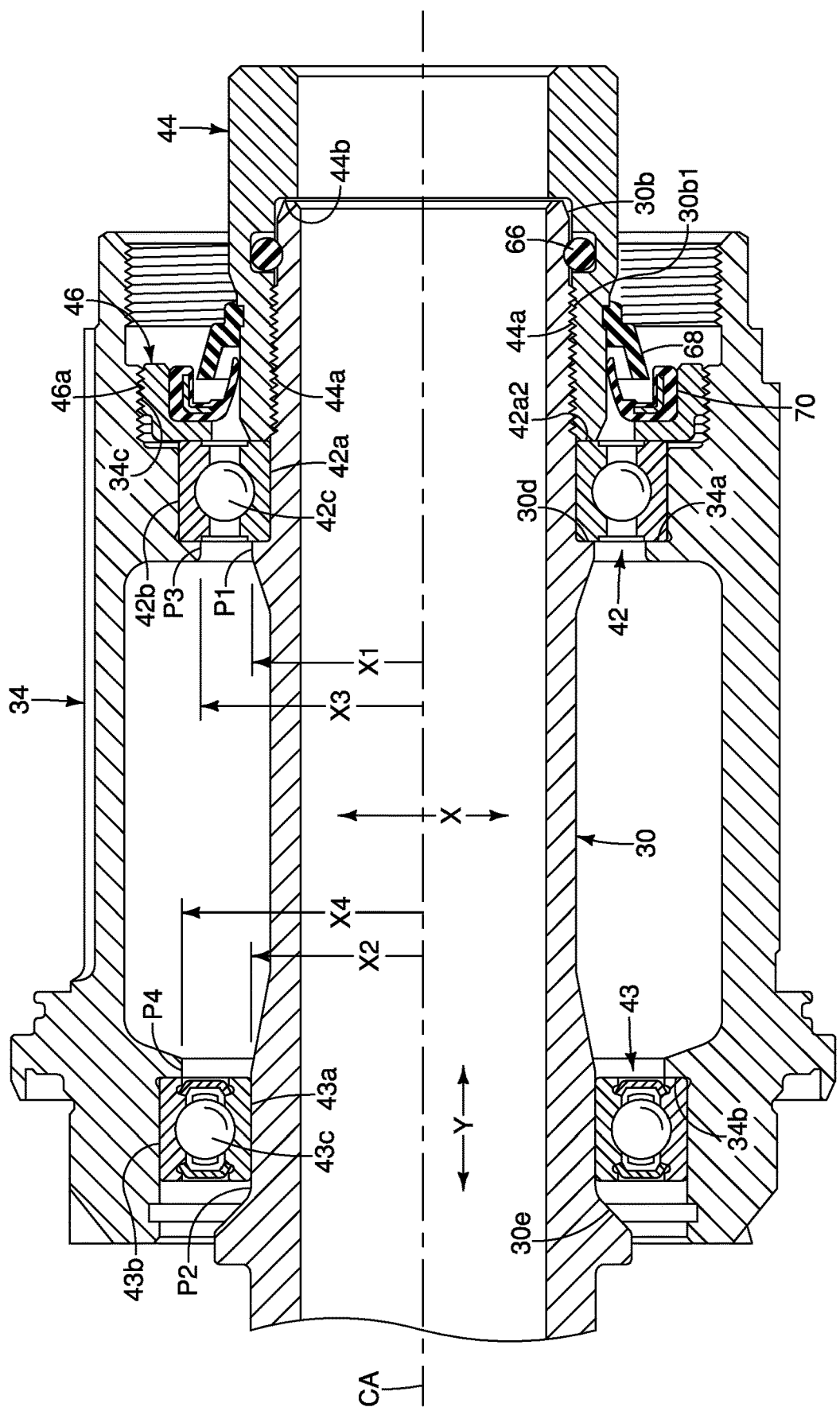
FIG. 6 is a longitudinal cross sectional view of selected parts of the hub illustrated in FIG. 2 showing a freewheel of the hub rotatably supported on a hub axle of the hub by a first bearing and a second bearing.

Referring now FIGS. 6 to 7, the rotatable connection between the hub axle 30 and the sprocket support 34 (i.e., the rotating body) will now be discussed in more detail. As mentioned above, in the illustrated embodiment, the sprocket support 34 (i.e., the rotating body) is rotatably supported on the hub axle 30 by the first bearing 42 and the second bearing 43.

The inner retainer 44 and the outer retainer 46 are configured to axially position the first bearing 42 between the hub axle 30 and the sprocket support 34. Specifically, the hub axle 30 includes a first inner abutment 30*d*, and the sprocket support 34 (i.e., the rotating body) includes a first outer abutment 34*a*. On the other hand, the first inner race 42*a* has a first axially facing portion 42*a*1 abutting the first inner abutment 30*d* of the hub axle 30, and the first outer race 42*b* has a first axially facing portion 42*b*1 abutting the first outer abutment 34*a* of the rotating body. In this way, axial movement of the first bearing 42 is limited in a direction towards the hub shell 32.

Axial movement of the first bearing 42 is limited in a direction away from the hub shell 32 by the inner retainer 44. Here, the inner retainer 44 is adjustably coupled to the hub axle 30 in the axial direction Y with respect to the rotational axis CA. In particular, the inner retainer 44 has an internal thread 44*a* that is threadedly engaged with an external thread 30*b*1 of the hub axle 30. The inner retainer 44 is coupled to the hub axle 30 and abuts a second axially facing portion 42*a*2 of the first inner race 42*a* of the first bearing 42. The inner retainer 44 has an axially facing surface 44*c* that abuts a second axially facing portion 42*a*2 of the first inner race 42*a* of the first bearing 42.

In this way, the inner retainer 44 can adjust the force that holds the first inner race 42*a* in the axial direction Y with respect to the rotational axis CA. The inner retainer 44 has an axially facing surface 44*b* that is spaced from the second end portion 30*b* of the hub axle 30. In this way, the inner retainer 44 can be securely prevented from moving in the axial direction Y along the hub axle 30. Also, here, the outer retainer 46 is adjustably coupled to the sprocket support 34 (i.e., the rotating body) in the axial direction Y with respect to the rotational axis CA. In particular, the outer retainer 46 has an external thread 46*a* that is threadedly engaged with an internal thread 34*c* of the sprocket support 34 (i.e., the rotating body). The outer retainer 46 is coupled to the rotating body and abuts a second axially facing portion 42*b*2 of the first outer race 42*b* of the first bearing 42. The outer retainer 46 has an axially facing surface 46*b* that abuts a second axially facing portion 42*b*2 of the first outer race 42*b* of the first bearing 42. In this way, the outer retainer 46 can adjust the force that holds the first outer race 42*b* in the axial direction Y with respect to the rotational axis CA.

As mentioned above, the inner retainer 44 includes the axially facing surface 44*b* and the axially facing surface 44*c*. With the inner retainer 44 screwed onto the second end portion 30*b* of the hub axle 30 and the outer retainer 46 screwed into the sprocket support 34, the axially facing surface 44b of the inner retainer 44 and the axially facing surface 46b are axially aligned with respect to the axial direction Y. On the other hand, the axially facing surface 44b is axially spaced from the axially facing surface 44c with respect to the axial direction Y so that the axially facing surface 44b is axially spaced away from the second end portion 30b of the hub axle 30. Each of the axially facing surface 44b, the axially facing surface 44c and axially facing surface 46b faces towards the first end portion 30a of the hub axle 30. The outer retainer 46 is arranged at the end portion of the sprocket support 34 on the side of the first axial direction A1.

Figure 8:
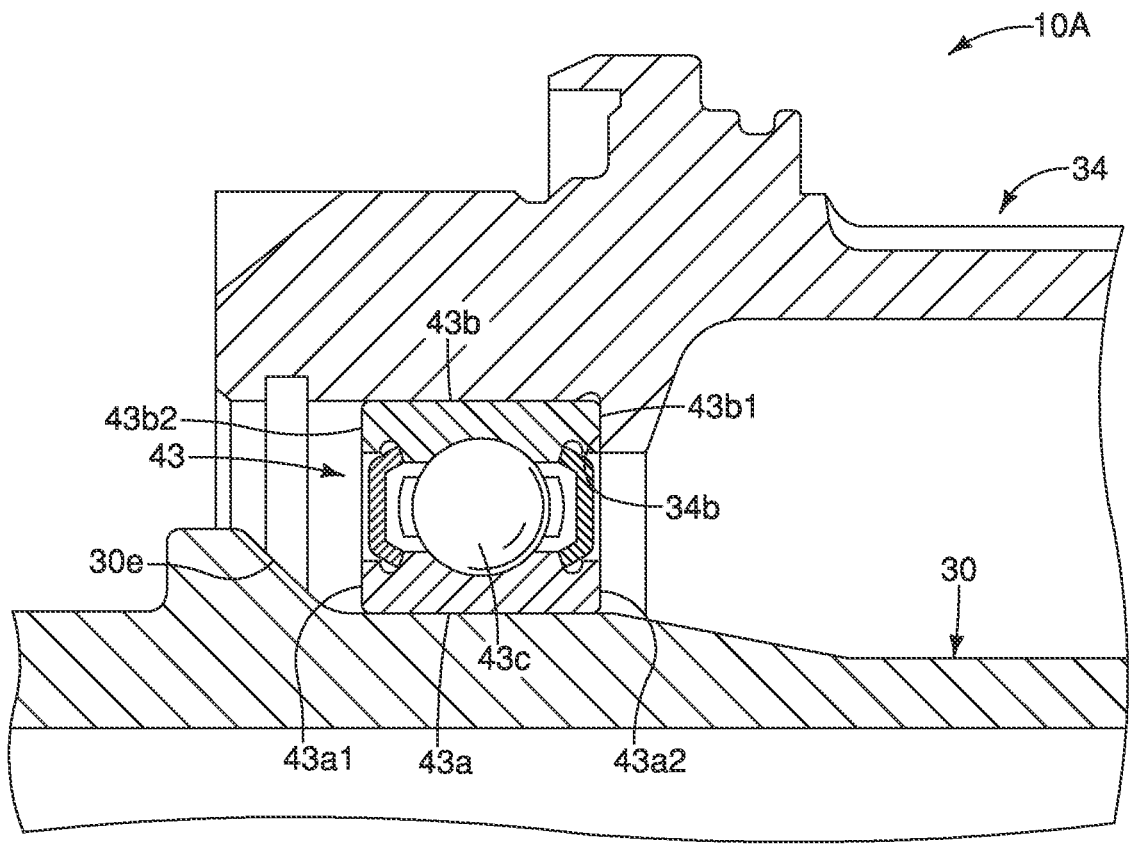
FIG. 8 is a longitudinal cross sectional view of a second portion of the hub illustrated in FIG. 6 showing the second bearing rotatably supporting a second end of the freewheel on the hub axle.

In the illustrated embodiment, as seen in FIG. 8, the second bearing 43 is press-fitted into the sprocket support 34 (i.e., the rotating body). Alternatively, the second bearing 43 is press-fitted into the hub axle 30. Here, the second inner race 43a has a third axially facing portion 43a1 facing a second inner abutment 30e of the hub axle 30, and the second outer race 43b has a third axially facing portion 43b1 facing a second outer abutment 34b of the sprocket support 34 (i.e., the rotating body). Here, the second inner race 43a further has a fourth axially facing portion 43a2 that faces in the opposite direction from the third axially facing portion 43a1 with respect to the axial direction Y. Also, the second outer race 43b further has a fourth axially facing portion 43b2 that faces in the opposite direction from the third axially facing portion 43b1 with respect to the axial direction Y. The third axially facing portion 43a1 and the fourth axially facing portion 43b2 are axially aligned with respect to the axial direction Y. Also, the third axially facing portion 43b1 and the fourth axially facing portion 43a2 are axially aligned with respect to the axial direction Y. Each of the third axially facing portion 43a1 and fourth axially facing portion 43b2 faces towards the first end portion 30a of the hub axle 30. Each of the fourth axially facing portion 43a2 and third axially facing portion 43b1 faces towards the second end portion 30b of the hub axle 30. The fourth axially facing portion 43a2 is closer to the second end portion 30b of the hub axle 30 than the third axially facing portion 43a1. The third axially facing portion 43b1 is closer to the second end portion 30b of the hub axle 30 than the fourth axially facing portion 43b2.

With this arrangement, the second outer abutment 34b abuts and contacts the third axially facing portion 43b1. Therefore, axial movement of the second bearing 43 is limited in a direction away from the hub shell 32 by the second outer abutment 34b of the sprocket support 34. On the other hand, the axial movement of the second bearing 43 in a direction towards the hub shell 32 is permitted since the second inner abutment 30e of the huh axle 30 is axially spaced from the second inner race 43a and the sprocket support 34 does not have any structure limiting the axial movement of the second outer race 43b in a direction towards the hub shell 32.

Alternatively, the third axially facing portion 43a1 can abuts and contacts the second inner abutment 30e. On the other hand, the second outer abutment 34b of the sprocket support 34 can be axially spaced from the second outer race 43b. Therefore, the hub axle 30 and the sprocket support 34 (i.e., the rotating body) could be configured such that axial movement of the second bearing 43 is limited in a direction towards the hub shell 32 by the second inner abutment 30e of the hub axle 30, and the axial movement of the second bearing 43 in a direction away from the hub shell 32 is permitted. In other words, preferably, at least one the second inner abutment 30e of the hub axle 30 and the second outer abutment 34b of the sprocket support 34 (i.e., the rotating body) is axially spaced from the second bearing 43. Also alternatively, the hub axle 30 and the sprocket support 34 (i.e., the rotating body) could be configured such that axial movement of the second bearing 43 is limited in neither of the axial directions. In this case, for example, the second bearing 43 is gap-fitted with respect to both the hub axle 30 and the sprocket support 34.

As mentioned above, as seen in FIG. 6, the hub axle 30 includes the first inner abutment 30d and the second inner abutment 30e, while the support 34 includes the first outer abutment 34a and the second outer abutment 34b. The first inner abutment 30d and the second inner abutment 30e are axially aligned with respect to the axial direction Y. On the other hand, the second inner abutment 30e and the second outer abutment 34b are axially offset with respect to the axial direction Y. The first inner abutment 30d and the first outer abutment 34a are closer to the second end portion 30b of the hub axle 30 than the second inner abutment 30e and the second outer abutment 34b with respect to the axial direction Y. The second inner abutment 30e and the second outer abutment 34b are located on opposite axial sides of the second bearing 43 with respect to the axial direction Y. The second inner abutment 30e is closer to the first end portion 30a of the hub axle 30 than the second outer abutment 34b with respect to the axial direction Y. Each of the first inner abutment 30d and the first outer abutment 34a faces towards the second end portion 30b of the hub axle 30. The second inner abutment 30e faces towards the second end portion 30b of the hub axle 30. The second outer abutment 34b faces towards the first end portion 30a of the hub axle 30.

As mentioned above, as seen in FIG. 7, the first inner race 42a of the first bearing 42 includes the first axially facing portion 42a1 and the second axially facing portion 42a2, while the first outer race 42b of the first bearing 42 includes the first axially facing portion 42b1 and the second axially facing portion 42b2. The first axially facing portion 42a1 and the first axially facing portion 42b1 are axially aligned with respect to the axial direction Y. Also, the first axially facing portion 42a1 and the first axially facing portion 42b1 faces towards the first end portion 30a of the hub axle 30. The second axially facing portion 42a2 and the second axially facing portion 42b2 are axially aligned with respect to the axial direction Y. Also, the second axially facing portion 42a2 and the second axially facing portion 42b2 faces towards the second end portion 30b of the hub axle 30. Accordingly, the first axially facing portion 42a1 and the first axially facing portion 42b1 are closer to the first end portion 30a of the hub axle 30 than the second axially facing portion 42a2 and the second axially facing portion 42b2. Also, the second axially facing portion 42a2 and the second axially facing portion 42b2 are closer to the second end portion 30b of the hub axle 30 than the first axially facing portion 42a1 and the first axially facing portion 42b1. When the inner retainer 44 is screwed into the sprocket support 34, the first inner race 42a is sandwiched between the first inner abutment 30d of the hub axle 30 and the axially facing surface 44c. When the outer retainer 46 is screwed onto the second end portion 30b of the hub axle 30, the first outer race 42b is sandwiched between the first outer abutment 34a and the axially facing surface 46b. The first inner race 42a further has a second axially facing portion 42a2 that faces in the opposite direction from the first axially facing portion 42a1 with respect to the axial direction Y. The first outer race 42b further has a second axially facing portion 42b2 that faces in the opposite direction from the first axially facing portion 42b1 with respect to the axial direction Y.

Figure 7:
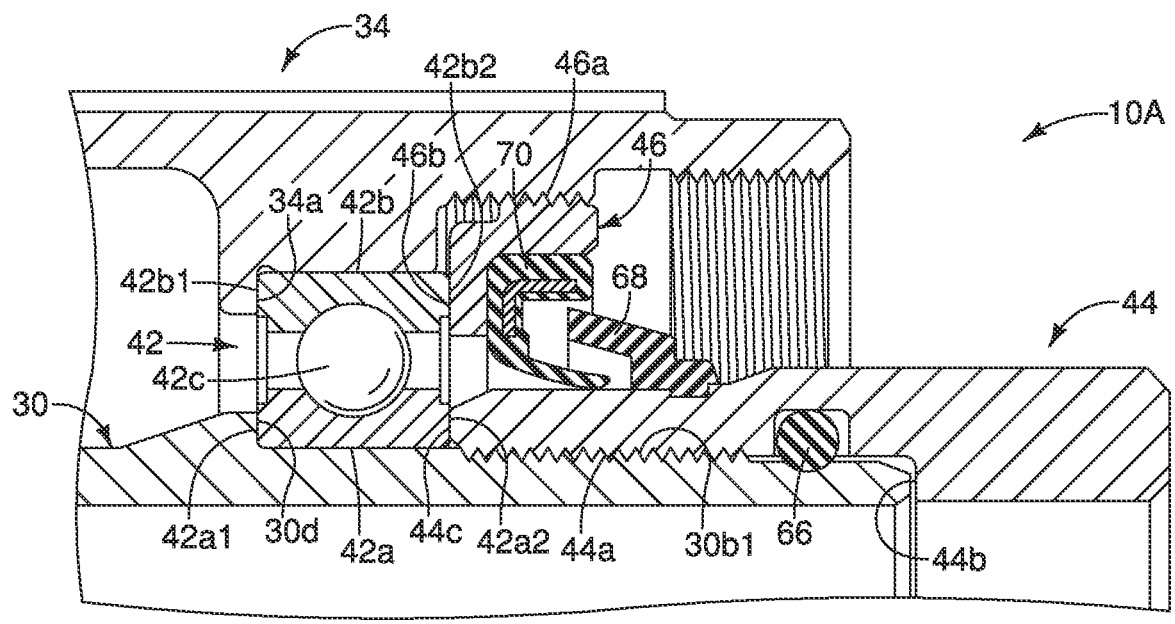
FIG. 7 is a longitudinal cross sectional view of a first portion of the hub illustrated in FIG. 6 showing the first bearing rotatably supporting a first end of the freewheel on the hub axle.

As seen in FIG. 7, the inner retainer 44 is provided with a first sealing ring 66 and a second sealing ring 68. The outer retainer 46 is provided with a sealing ring 70. The first sealing ring 66 is provided to the interior of the inner retainer 44, while the second sealing ring 68 is provided to the exterior of the inner retainer 44. The first sealing ring 66 seals the interface between the hub axle 30 and the inner retainer 44. The sealing ring 70 is provided to the interior of the outer retainer 46 and contacts exterior surface of the inner retainer 44. The second sealing ring 68 and the sealing ring 70 form a labyrinth structure. This structure, for example, prevents the ingress of muddy water and dust from the outside.

Referring now FIG. 6, the configurations of the first inner abutment 30d and the second inner abutment 30e will now be discussed in more detail. In the illustrated embodiment, the first inner abutment 30d is integrally formed on an outer surface of the hub axle 30 as an integrated part of the hub axle 30. Likewise, in the illustrated embodiment, the second inner abutment 30e is integrally formed on the outer surface of the hub axle 30 as an integrated part of the hub axle 30. However, one or both of the first inner abutment 30d and the second inner abutment 30e can be a separate part that is fixedly secured to the hub axle 30 as needed and/or desired. Also, an outermost point P1 of the first inner abutment 30d of the hub axle 30 is radially spaced from the rotational axis CA by a first radial distance X1, and an innermost point P2 of the second inner abutment 30e of the hub axle 30 is radially spaced from the rotational axis CA by a second radial distance X2 that is larger than the first radial distance X1. In this way, during installation of the second bearing 43 that is press-fitted to the sprocket support 34, the second bearing 43 can pass over the first inner abutment 30d but not over the second inner abutment 30e.

Similarly, in the illustrated embodiment, the first outer abutment 34a is integrally formed on an inner surface of the sprocket support 34 (i.e., the rotating body) as an integrated part of the sprocket support 34 (i.e., the rotating body). Also, the second outer abutment 34b is integrally formed on an inner surface of the rotating body as an integrated part of the sprocket support 34 (i.e., the rotating body). However, one or both of the first outer abutment 34a and the second outer abutment 34b can be a separate part that is fixedly secured to the sprocket support 34 as needed and/or desired. An innermost point P3 of the first outer abutment 34a of the sprocket support 34 (i.e., the rotating body) is radially spaced from the rotational axis CA by a third radial distance X3, and an innermost point P4 of the second outer abutment 34b of the sprocket support 34 (i.e., the rotating body) is radially spaced from the rotational axis CA by a fourth radial distance X4 that is larger than the third radial distance X3. The outermost point P1 of the first inner abutment 30d of the hub axle 30 is radially spaced from the rotational axis CA by a first radial distance X1, and the fourth radial distance X4 is larger than the first radial distance X1.

Figure 9:
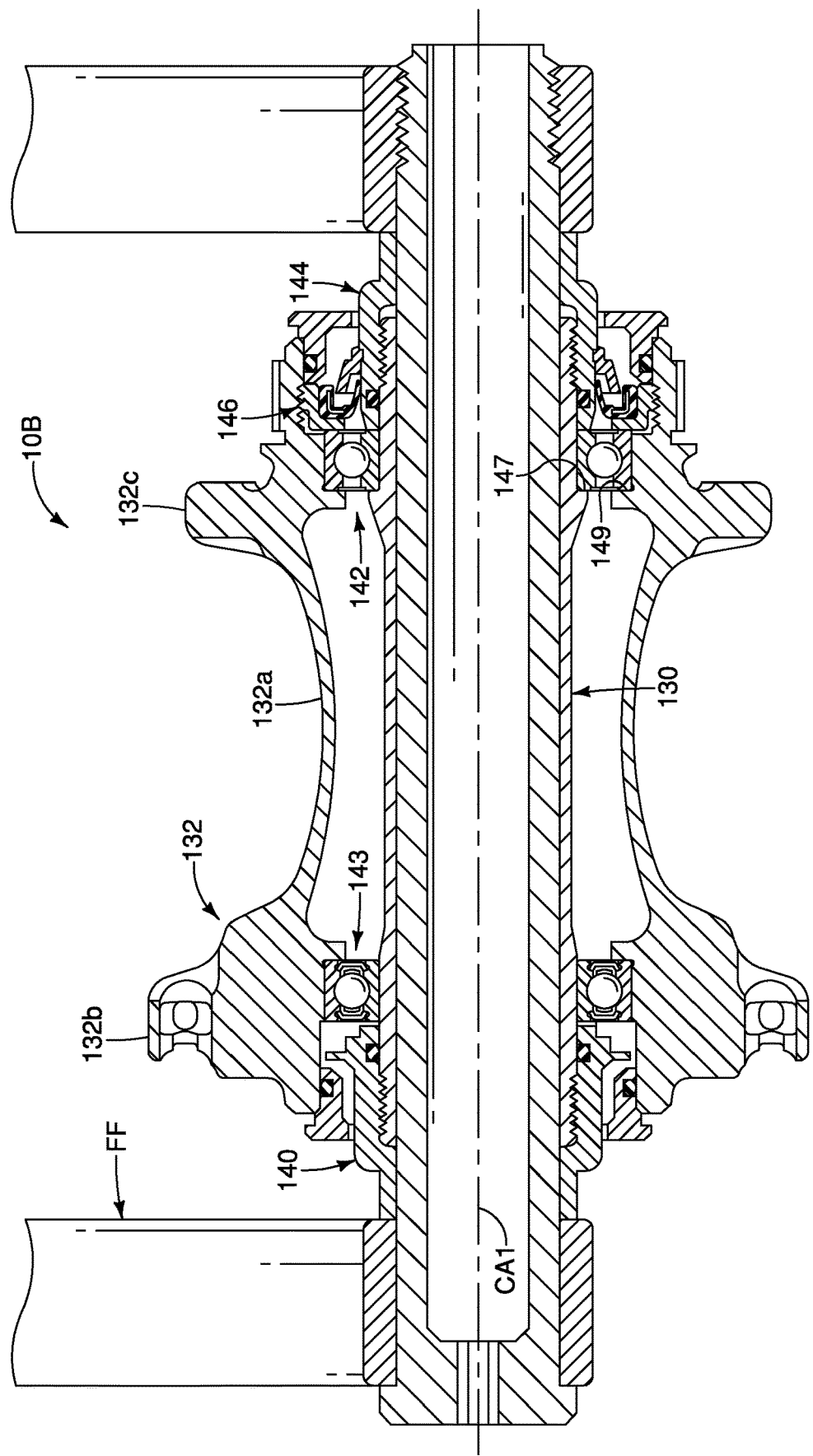
FIG. 9 is a longitudinal cross sectional view of the hub of a front wheel of the human-powered vehicle illustrated in FIG. 1.

The structure of the hub 10B will now be described with particular reference to FIG. 9. The hub 10B basically comprises a hub axle 130 and a hub shell 132. The hub shell 132 is one example of a rotating body. In other words, the hub 10A comprises a hub axle (e.g., the hub axle 130) and a rotating body (e.g., the hub shell 132). Thus, in the hub 10B, the rotating body includes the hub shell 132. The hub axle 30 defines a rotational axis CA1. According, in the hub 10B, the hub shell 132 is rotatably mounted on the hub axle 130 to rotate around the rotational axis CA1 in substantially the same manner as the sprocket support 34 is rotatably mounted on the hub axle 30 in the hub 10A. In other words, the rotating body (e.g., the hub shell 132) is rotatably mounted on the hub axle 130 to rotate around the rotational axis CA1. In view of the similarities between the hub 10A and the hub 10B, the hub 10B will not be discussed in as much detail.

The hub shell 132 has a center tubular body 132a and a pair of spoke attachment flanges 132b and 132c extending radially outward from the center tubular body 132a. The spoke attachment flanges 132b and 132c are configured to receive the inner ends of the spokes of the rear wheel in a conventional manner. Thus, here, the rotating body (i.e., the hub shell 132) includes a spoke attachment structure (i.e., the spoke attachment flanges 132b and 132c).

Here, the hub 10B further comprises a retainer 140 that is screwed onto a first end portion of the hub axle 130. Also, the hub 10B further comprises a first bearing 142 and a second bearing 143. The retainer 140 is configured to axially position the second bearing 143. The first bearing 142 and the second bearing 143 are radial ball bearings. The inner retainer 140 is arranged with a gap with respect to the inner race of the second bearing 143. Alternatively, the inner retainer 140 is arranged in contact with the inner race of the second bearing 143 to the extent that it does not affect the performance of the second bearing 143. Also, the hub 10B further comprises an inner retainer 144 and an outer retainer 146. The inner retainer 144 and the outer retainer 146 are configured to axially position the first bearing 142. In particular, the hub axle 130 is provided an inner abutment 147, while the hub shell 132 (i.e., the rotating body) includes an outer abutment 149. In this way, axially movement of the first bearing 142 is prevented.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle field (e.g., bicycle) in an upright, riding position and equipped with the hub. Accordingly, these directional terms, as utilized to describe the hub should be interpreted relative to a human-powered vehicle field (e.g., bicycle) in an upright riding position on a horizontal surface and that is equipped with the hub. The terms "left" and "right" are used to indicate the "right" when referencing from the right side as viewed from the rear of the human-powered vehicle field (e.g., bicycle), and the "left" when referencing from the left side as viewed from the rear of the human-powered vehicle field (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hub for a human-powered vehicle, the hub comprising:
a hub axle including a first inner abutment, the hub axle defining a rotational axis, the first inner abutment being integrally formed on an outer surface of the hub axle as an integrated part of the hub axle;
a rotating body rotatably mounted on the hub axle to rotate around the rotational axis, the rotating body including a first outer abutment;
a first bearing disposed between the hub axle and the rotating body in a radial direction with respect to the rotational axis to rotatably couple the rotating body to the hub axle, the first bearing including a first inner race halting a first axially facing portion abutting the first inner abutment of the hub axle, a first outer race having a first axially facing portion abutting the first outer abutment of the rotating body, and a plurality of first roller elements disposed between the first inner race and the first outer race;
an inner retainer coupled to the hub axle and abutting a second axially facing portion of the first inner race of the first bearing;
an outer retainer coupled to the rotating body and abutting a second axially facing portion of the first outer race of the first bearing; and
a second bearing disposed between the hub axle and the rotating both in a radial direction with respect to the rotational axis to rotatably couple the rotating body to the hub axle, the second bearing including a second inner race having a third axially facing portion facing a second inner abutment of the hub axle, a second outer race haling a third axially facing portion facing a second outer abutment of the rotating body, and a plurality of second rolling elements disposed between the second inner race and the second outer race,
the second inner abutment of the hub axle being axially spaced from the second inner race of the second bearing.

2. The hub according to claim 1, wherein
the inner retainer is adjustably coupled to the hub axle in an axial direction with respect to the rotational axis.

3. The hub according to claim 1, wherein
the inner retainer has an internal thread that is threadedly engaged with an external thread of the hub axle.

4. The hub according to claim 1, wherein
the outer retainer is adjustably coupled to the rotating body in an axial direction with respect to the rotational axis.

5. The hub according to claim 1, wherein
the outer retainer has an external thread that is threadedly engaged with an internal thread of the rotating body.

6. The hub according to claim 1, wherein
the hub axle includes a hollow body.

7. The hub according to claim 1, wherein
the first outer abutment is integrally formed on an inner surface of the rotating body as an integrated part of the rotating body.

8. The hub according to claim 1, wherein
an outermost point of the first inner abutment of the hub axle is radially spaced from the rotational axis by a first radial distance, and an innermost point of the second inner abutment of the hub axle is radially spaced from the rotational axis by a second radial distance that is larger than the first radial distance.

9. The hub according to claim 1, wherein
an innermost point of the first outer abutment of the rotating body is radially spaced from the rotational axis by a third radial distance, and an innermost point of the second outer abutment of the rotating body is radially spaced from the rotational axis by a fourth radial distance that is larger than the third radial distance.

10. The hub according to claim 9, wherein
an outermost point of the first inner abutment of the hub axle is radially spaced from the rotational axis by a first radial distance, and the fourth radial distance is larger than the first radial distance.

11. The hub according to claim 1, wherein
the second inner abutment is integrally formed on an outer surface of the hub axle as an integrated part of the hub axle.

12. The hub according to claim 1, wherein
the second outer abutment is integrally formed on an inner surface of the rotating body as an integrated part of the rotating body.
13. The hub according to claim 1, wherein
the rotating body includes a sprocket support.
14. The hub according to claim 1, further comprising
a hub shell rotatably mounted on the hub axle to rotate around the rotational axis, and
the rotating body being coupled to the hub shell to rotate together in a driving rotational direction around the rotational axis, and the rotating body being configured to rotate relative to the hub shell in a non-driving rotational direction around the rotational axis.
15. The hub according to claim 1, wherein
the rotating body includes a spoke attachment structure.

* * * * *